(12) United States Patent
Möller et al.

(10) Patent No.: US 8,889,060 B2
(45) Date of Patent: Nov. 18, 2014

(54) DEVICE FOR REGULATING THE TEMPERATURE OF A GAS IN A HOT GAS MAIN

(75) Inventors: Manfred Möller, Wiesbaden-Auringen (DE); Friedrich Eschmann, Bischofsheim (DE); Jean-Paul Simoes, Walferdange (LU)

(73) Assignees: Paul Wurth S.A., Luxembourg (LU); Paul Wurth Refractory & Engineering GmbH (DE)

( * ) Notice: Subject to any disclaimer, the term of this patent is extended or adjusted under 35 U.S.C. 154(b) by 352 days.

(21) Appl. No.: 13/320,623

(22) PCT Filed: May 18, 2010

(86) PCT No.: PCT/EP2010/056767
§ 371 (c)(1),
(2), (4) Date: Jan. 11, 2012

(87) PCT Pub. No.: WO2010/133563
PCT Pub. Date: Nov. 25, 2010

(65) Prior Publication Data
US 2012/0111245 A1  May 10, 2012

(30) Foreign Application Priority Data
May 20, 2009 (EP) .................................. 09160805

(51) Int. Cl.
| F23K 5/00 | (2006.01) |
| C21B 9/16 | (2006.01) |
| C21B 5/06 | (2006.01) |
| F27B 1/16 | (2006.01) |
| F27D 99/00 | (2010.01) |

(52) U.S. Cl.
CPC ... *C21B 9/16* (2013.01); *C21B 5/06* (2013.01); *F27B 1/16* (2013.01); *F27D 99/0033* (2013.01)
USPC .......................................... 266/156; 266/154

(58) Field of Classification Search
CPC ................ C21B 5/06; C21B 9/16; C21B 9/10
USPC .................................................. 266/154, 156
See application file for complete search history.

(56) References Cited

U.S. PATENT DOCUMENTS

| 3,913,617 | A | * | 10/1975 | van Laar et al. | ............... 266/188 |
| 4,150,817 | A | * | 4/1979 | Regelin et al. | ................. 266/139 |
| 8,550,811 | B2 | * | 10/2013 | Simoes et al. | ................... 431/12 |

FOREIGN PATENT DOCUMENTS

EP   0397134 A1   11/1990
(Continued)

OTHER PUBLICATIONS

International Search Report PCT/EP2010/056767; Dated Sep. 20, 2010.

*Primary Examiner* — Scott Kastler
(74) *Attorney, Agent, or Firm* — Cantor Colburn LLP

(57) ABSTRACT

A device for regulating the temperature of a gas in a hot gas main for feeding hot gas to a blast furnace includes a mixing pot with two mixing chambers in fluid communication with each other by means of a Venturi restriction. The first mixing chamber includes three inlet ports for feeding hot gas into the first mixing chamber, feeding cold gas into the first mixing chamber and feeding cold gas into the second mixing chamber, respectively. The first mixing chamber further includes an outlet port for feeding a first stream of mixed gas from the first mixing chamber to a first gas distribution system. The second mixing chamber includes a second outlet port for feeding a second stream of mixed gas from the second mixing chamber to a second gas distribution system. The first and second streams of mixed gas have different temperatures.

14 Claims, 1 Drawing Sheet

(56) References Cited

FOREIGN PATENT DOCUMENTS

| | | | |
|---|---|---|---|
| EP | 1255073 | A2 | 11/2002 |
| FR | 2848123 | A1 | 6/2004 |
| KR | 20040000114 | A | 1/2004 |
| LU | 91542 | A1 | 9/2010 |

\* cited by examiner

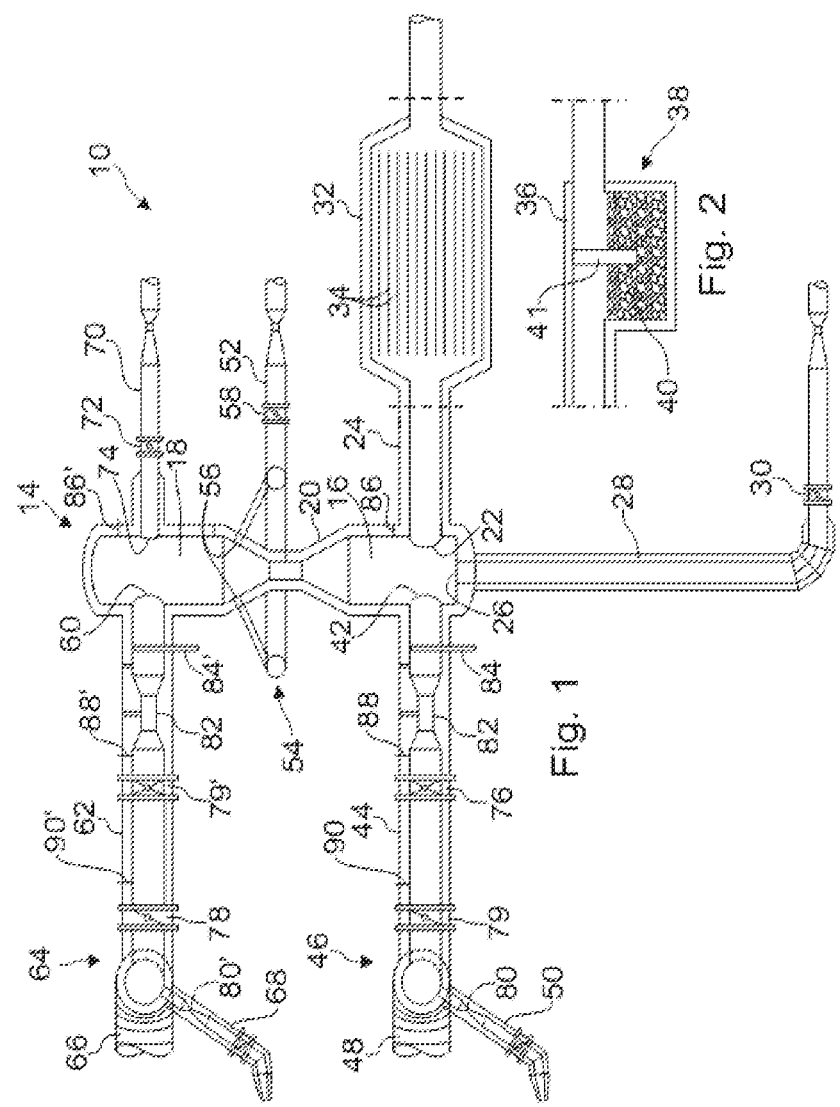

US 8,889,060 B2

DEVICE FOR REGULATING THE TEMPERATURE OF A GAS IN A HOT GAS MAIN

TECHNICAL FIELD

The present invention generally relates to a device for regulating the temperature and/or the flow rate of a gas in a hot gas main for feeding hot gas to a blast furnace, in particular for feeding two separate streams of hot gas at different constant temperatures to the blast furnace.

BACKGROUND

Blast furnaces are generally fed with hot gas received from a heat regenerator such as a hot stove or a pebble heater. One inherent feature of such regenerators is the fact that the temperature of the hot gas leaving a regenerator during the blast stage gradually decreases. Also, it is generally desired to feed hot gas of constant temperature to the blast furnace. The gradually decreasing temperature of the hot gas therefore has to be adapted by mixing in cold gas in amounts chosen to obtain a constant temperature. Indeed, the temperature variations of the hot gas must be leveled out. This is generally achieved by mixing in cold gas in amounts sufficient to lower the temperature of the hot gas to its lowest value, i.e. to the temperature of the hot gas at the end of the blowing cycle. By adding the correct amount of cold gas to the hot gas, the temperature of the hot gas is lowered to a constant temperature in order to feed a gas at constant temperature to the blast furnace.

In recent years, it has been found that it may be beneficial to feed two separate streams of hot gas to the blast furnace at two separate levels to improve the efficiency of the blast furnace. Preferably, the two separate streams of hot gas are furthermore at different constant temperatures. This has e.g. been suggested in co-pending patent application LU 91 542 filed on Mar. 17, 2009.

BRIEF SUMMARY

The invention provides a device for regulating the temperature of the hot gas, wherein two separate streams of different temperature may be produced.

The present invention proposes a device for regulating the temperature of a gas in a hot gas main for feeding hot gas to a blast furnace. Such a device comprises a mixing pot with a chamber, an inlet port for receiving hot gas, an inlet port for receiving cold gas and an outlet port for evacuating mixed gas; and a regulation system for controlling the amount of cold gas fed to the chamber. According to an important aspect of the invention, the mixing pot comprises a housing with a first mixing chamber and a second mixing chamber defined therein, the first and second mixing chambers being in fluid communication with each other by means of a Venturi-type restriction. The first mixing chamber is provided with a first inlet port for feeding hot gas into the first mixing chamber, a second inlet port for feeding cold gas into the first mixing chamber and a third inlet port for feeding cold gas into the second mixing chamber. The first mixing chamber is further provided with a first outlet port for feeding a first stream of mixed gas from the first mixing chamber to a first gas distribution system for feeding the first stream of mixed gas to the blast furnace at a first level, while the second mixing chamber is provided with a second outlet port for feeding a second stream of mixed gas from the second mixing chamber to a second gas distribution system for feeding the second stream of mixed gas to the blast furnace at a second level. The first stream of mixed gas has a temperature different from a temperature of the second stream of mixed gas.

The present invention therefore proposes a single mixing pot having two mixing chambers for obtaining two separate gas streams having two separate temperatures. The hot gas may be at a temperature T1, gradually decreasing from a maximal temperature $T_{max}$ to a minimum temperature $T_{min}$. The cold gas may be at a temperature T2. In the first mixing chamber, cold gas is added to the hot gas in amounts so as to obtain a mixed gas at a constant temperature T3, essentially corresponding to the a minimum temperature $T_{min}$. In the second mixing chamber, cold gas at temperature T2 is added to the already mixed gas at constant temperature T3 to bring the mixed gas to a constant temperature T4, wherein T4<T3. Consequently, the mixing pot according to the present invention allows gas to be fed to the blast furnace on two separate levels and at two separate constant temperatures. The reasons for and advantages of feeding gas on two separate levels and at two separate constant temperatures into the blast furnace have been described in co-pending patent application LU 91 542, herewith incorporated by reference.

In the context of the present invention, it should be noted that "hot gas" may e.g. refer to air, enriched air, recycled top gas or decarbonated top gas.

The third inlet port is advantageously formed by a plurality of openings arranged around the circumference of the second mixing chamber. Such an arrangement, which may be a spider-type distribution system, ensures that the cold gas fed into the second mixing chamber is well mixed with the hot blast gas, thereby obtaining a homogeneous mixture.

The third inlet port is preferably formed by a plurality of openings arranged around the circumference of the Venturi-type restriction. These openings advantageously open into the portion of the Venturi-type restriction facing the second chamber, thereby forcing the incoming cold gas towards the second mixing chamber. The backflow of gas from the second mixing chamber towards the first mixing chamber can thereby also be avoided.

Advantageously, the third inlet port openings are not directed towards the vertical axis of the device. Instead, the inlet ports are arranged so as to form a swirling motion within the second mixing chamber, thereby ensuring a homogeneous mixture in the second mixing chamber.

According to one embodiment, the mixing pot further comprises a fourth inlet port in the second mixing chamber for feeding gas into the second mixing chamber; the fourth inlet port being arranged opposite the second outlet port. A fourth conduit is preferably associated with the fourth inlet port for feeding gas to the mixing pot, and a control valve may be arranged in the fourth conduit for regulating the flow of gas into the mixing pot. Although the gas fed through the fourth conduit may be cold gas, it may be advantageous to allow the fourth conduit to be used to feed an inert gas to the second gas distribution system. Indeed, the fourth inlet port may be used for safety reasons, e.g. to purge the second gas distribution system. A fast inertisation of the second gas distribution system may be achieved due to the feeding of an inert gas through the fourth inlet port.

A first conduit may be associated with the first inlet port for feeding hot gas from a regenerator to the mixing pot. Such a first conduit advantageously comprises an attenuation device for attenuating the temperature differences of the hot gas received from the regenerator. The hot gas coming from the regenerator has its temperature varying between a maximum temperature $T_{max}$ at the beginning of the blast phase of the regenerator and a minimum temperature $T_{min}$ at the end of the blast phase. The attenuation device absorbs some heat from the hot gas during the beginning of the blast phase of the regenerator and transfers this heat back to the hot gas during the end of the blast phase, thereby forming a hot blast gas having an attenuated temperature difference. The attenuated maximum temperature $T_{att-max}$ downstream of the attenuation device is lower than the maximum temperature $T_{max}$ upstream of the attenuation device. Similarly, the attenuated minimum temperature $T_{att-min}$ downstream of the attenuation device is higher than the minimum temperature $T_{min}$ upstream of the attenuation device. As the attenuated minimum temperature $T_{att-min}$ is higher than the minimum temperature $T_{min}$, the amount of cold gas necessary to achieve a constant target temperature can be reduced over the whole blast phase of the regenerator. Due to the attenuation device, a more efficient use of natural resources can be achieve to obtain the target temperature. Alternatively, a higher blast temperature may be achieved, thereby reducing the amount of coke to be charged into the blast furnace.

The attenuation device may comprise an arrangement of heat storing plates or a pebble bed through which the hot gas is led.

Preferably, a second conduit is associated with the second inlet port for feeding cold gas to the mixing pot, and a third conduit is associated with the third inlet port for feeding cold gas to the mixing pot, and a control valve is arranged in each of the second and third conduit for regulating the flow of cold gas into the mixing pot.

A first feed line may be associated with the first outlet port for feeding the first stream of mixed gas from the first mixing chamber to the first gas distribution system; and a second feed line may be associated with the second outlet port for feeding the second stream of mixed gas from the second mixing chamber to the second gas distribution system. Due to the above described mixing pot, the first and second streams of mixed gas through the first and second feed lines are at separate constant temperatures.

Advantageously, the device further comprises means for measuring the volume of gas flow of the first stream of mixed gas; and means for measuring the volume of gas flow of the second stream of mixed gas. Such means may be a venturi in the first or second feed line, a venturi in the first or second gas distribution system, acoustic emitters and receivers, annubar in the first or second feed line. This means may be provided individually or in combination with each other.

The device preferably further comprises means for regulating the volume of gas flow of the first stream of mixed gas; and means for regulating the volume of gas flow of the second stream of mixed gas.

BRIEF DESCRIPTION OF THE DRAWINGS

Preferred embodiments of the invention will now be described, by way of example, with reference to the accompanying drawings, in which:

FIG. 1 is a schematic view of a distribution system with a mixing pot according to the present invention; and FIG. 2 is a schematic view of an alternative attenuation device for the distribution system of FIG. 1.

DETAILED DESCRIPTION

FIG. 1 generally shows a distribution system 10 for feeding hot gas from one or more regenerators (not shown) to a blast furnace (not shown). Hot gas is generally heated to a temperature between about 1000° C. and 1250° C. in a number of regenerators, typically blast furnace stoves or Cowpers. The regenerators and the functioning thereof are well known to the skilled person and need not be described herein. As the regenerators provide a hot gas with gradually decreasing temperature and as it is generally desired to feed hot gas at constant temperature to the blast furnace, a device for regulating the temperature of the hot gas is arranged in the distribution system. In such a device, a regulated amount of cold gas is fed into the stream of hot gas so as to bring the temperature of the hot gas to a constant temperature, generally the lowest temperature of the hot gas coming from the regenerators.

A device for regulating the temperature of the hot gas according to the invention comprises, as shown in FIG. 1, a mixing pot 14 having a first mixing chamber 16 and a second mixing chamber 18. The first and second mixing chambers 16, 18 are in fluid communication with each other through a Venturi-type restriction 20.

The first mixing chamber 16 comprises a first inlet port 22 with an associated first conduit 24 for receiving hot gas from the regenerators. The first mixing chamber 16 further comprises a second inlet port 26 with an associated second conduit 28 for receiving cold gas. A first valve 30 is arranged in the second conduit 28 for regulating the amount of cold gas fed into the first chamber 16.

The hot gas fed through the first conduit 24 has its temperature varying between a maximum temperature $T_{max}$ at the beginning of the blast phase of the regenerator and a minimum temperature $T_{min}$ at the end of the blast phase. In order to obtain a constant temperature for feeding to the blast furnace, a regulated amount of cold gas is mixed with the hot gas so as to achieve the minimum temperature $T_{min}$.

The first conduit 24 advantageously comprises an attenuation device 32, a first embodiment of which is shown in FIG. 1. The attenuation device 32, which may be described as a small horizontal regenerator, is arranged in line with the first conduit 24 and has an enlarged cross-section. The attenuation device 32 comprises ceramic material capable of absorbing some heat from the hot gas during the beginning of the blast phase of the regenerator and transferring this heat back to the hot gas during the end of the blast phase, thereby attenuating the temperature difference between $T_{max}$ and $T_{min}$. The ceramic material may be a series of heating plates, schematically represented by reference number 34. Other ceramic material such as pipes or bricks may however also be considered. The attenuated maximum temperature $T_{att-max}$ downstream of the attenuation device 32 is lower than the maximum temperature $T_{max}$ upstream of the attenuation device 32. Similarly, the attenuated minimum temperature $T_{att-min}$ downstream of the attenuation device 32 is higher than the minimum temperature $T_{min}$ upstream of the attenuation device 32. As the amount of cold gas is calculated to always obtain the lowest temperature fed to the mixing pot 14, and as the attenuated minimum temperature $T_{att-min}$ is higher than the minimum temperature $T_{min}$, the amount of cold gas necessary to achieve this constant temperature can be reduced over the whole blast phase of the regenerator. In other words, less heat added to the hot gas in the regenerator has to again be removed by the mixing pot 14.

The attenuation device 32 allows for a higher temperature gas to be fed to the blast furnace. On the other hand, the attenuation device 32 allows for the regenerator to be operated at lower temperatures, which may be advantageous, in particular if the gas comprises recycled decarbonated top gas with high hydrogen content that may react at higher temperatures. The attenuation device 32 also allows to more quickly reach the working temperature. Such a more efficient use of natural resources leads to reduced $CO_2$ emissions.

A second embodiment of an attenuation device 36, shown in FIG. 2, comprises a pebble chamber 38 filled with heat absorbing pebble material 40. A chicane 41 is arranged in the first conduit 24 so as to force the hot gas through the pebble chamber 38.

The first mixing chamber 16 comprises a first outlet port 42 with an associated first feed line 44 for feeding a temperature regulated gas to a first gas distribution device 46 comprising a first bustle pipe 48 and a first set of tuyeres 50.

The second mixing chamber 18 is in fluid communication with the first mixing chamber 16 via the Venturi-type restriction 20. An already mixed gas at homogenous temperature is fed from the first mixing chamber 16 into the second mixing chamber 18. A third conduit 52 is associated with the mixing pot 14 for feeding cold gas into the second mixing chamber 18, preferably via a spider-type distribution system 54 through a plurality of third inlet ports 56. A second valve 58 is arranged in the third conduit 52 for regulating the amount of cold gas fed into the second mixing chamber 18. It should be noted that the third inlet ports 56 are advantageously arranged in the conical portion of the Venturi-type restriction 20 facing the second mixing chamber 18, thereby ensuring that the cold gas fed through the third conduit 52 is directed into the second mixing chamber 18 in a direction away from the first mixing chamber 16. Any backflow of gas from the second mixing chamber 18 towards or into the first mixing chamber 16 is thereby also avoided. Furthermore, the third inlet ports 56 are preferably arranged so as to cause a swirling motion within the second mixing chamber 18. In order to achieve this, the third inlet ports 56 are arranged at an angle with respect to the radial direction of the mixing pot 14, i.e. the third inlet ports 56 are not directed towards the axis of the mixing pot 14.

The second mixing chamber 18 comprises a second outlet port 60 with an associated second feed line 62 for feeding a temperature regulated gas to a second gas distribution device 64 comprising a second bustle pipe 66 and a second set of tuyeres 68.

The mixing of hot gas with cold gas is advantageously regulated by means of the first and second valves 30, 58 in such a way that gas having a constant temperature, chosen in the region between 900° C. and 1250° C., is fed to the first gas distribution device 46, whereas gas having a constant temperature, chosen in the region between 850° C. and 950° C., is fed to the second gas distribution device 64.

The present invention allows gas to leave the mixing pot 14 on two separate levels and at two separate constant temperatures.

According to an embodiment of the invention, a fourth conduit 70 with an associated third valve 72 is provided for further feeding gas to the second mixing chamber 18 via a fourth inlet port 74. Although the gas fed through the fourth conduit 70 may be cold gas, it may also be an inert gas used to inert the second gas distribution device 64 if need be. For this reason, the fourth inlet port 74 is preferably arranged opposite the second outlet port 60.

Each of the first and second feed lines 44, 62 comprises a regulator valve 76, 78 for regulating the amount of gas fed to the first and second gas distribution device 46, 64. Gas slide valves 79, 79' may also be provided in the first and second feed lines 44, 62.

The flow rate of the gas fed to the blast furnace can be measured by different means, such as a Venturi 80, 80' in each of the tuyeres 50, 68, a Venturi 82, 82' in the first and second feed lines 44, 62, annubars 84, 84' or acoustic emitters 86, 86' with their associated acoustic receivers 88, 90, 88', 90'. It should be noted that these means may be used independently or in combination with one another.

The invention claimed is:

1. A device for regulating a temperature of a gas in a hot gas main for feeding hot gas to a blast furnace, said device comprising:
    a mixing pot with a chamber,
    an inlet port for receiving hot gas,
    an inlet port for receiving cold gas
    an outlet port for evacuating mixed gas;
    a regulation system for controlling an amount of cold gas fed to the chamber;
    wherein said mixing pot comprises
        a housing with a first mixing chamber and a second mixing chamber defined therein, said first and second mixing chambers being in fluid communication with each other by means of a Venturi restriction;
        a first inlet port in said first mixing chamber for feeding hot gas into said first mixing chamber;
        a second inlet port with said first mixing chamber for feeding cold gas into said first mixing chamber;
        a third inlet port in said second mixing chamber for feeding cold gas into said second mixing chamber;
        a first outlet port in said first mixing chamber for feeding a first stream of mixed gas from said first mixing chamber to a first gas distribution system for feeding said first stream of mixed gas to said blast furnace at a first level; and
        a second outlet port in said second mixing chamber for feeding a second stream of mixed gas from said second mixing chamber to a second gas distribution system for feeding said second stream of mixed gas to said blast furnace at a second level,
    wherein said first stream of mixed gas has a temperature different from a temperature of said second stream of mixed gas.

2. The device according to claim 1, wherein said third inlet port is formed by a plurality of openings arranged around a circumference of said second mixing chamber.

3. The device according to claim 1, wherein said third inlet port is formed by a plurality of openings arranged around a circumference of said Venturi restriction, said openings being arranged in a portion of the Venturi restriction facing the second chamber.

4. The device according to claim 2, wherein said third inlet port openings are arranged so as to form a swirling motion within the second mixing chamber.

5. The device according to claim 1, wherein said mixing pot comprises a fourth inlet port in said second mixing chamber for feeding gas into said second mixing chamber; said fourth inlet port being arranged opposite said second outlet port.

6. The device according to claim 1, wherein
    a first conduit is associated with said first inlet port for feeding hot gas from a regenerator to said mixing pot, said first conduit comprising an attenuation device for attenuating temperature differences of the hot gas received from said regenerator.

7. The device according to claim 6, wherein said attenuation device comprises an arrangement of heat storing plates.

8. The device according to claim 6, wherein said attenuation device comprises a pebble bed through which said hot gas is led.

9. The device according to claim 1, wherein
    a second conduit is associated with said second inlet port for feeding cold gas to said mixing pot, and
    a third conduit is associated with said third inlet port for feeding cold gas to said mixing pot, and a control valve is arranged in each of said second and third conduits for regulating the flow of cold gas into said mixing pot.

10. The device according to claim 9, wherein
a fourth conduit is associated with said fourth inlet port for feeding gas to said mixing pot, and
a control valve is arranged in said fourth conduit for regulating the flow of gas into said mixing pot.

11. The device according to claim 10, wherein
said gas fed through said fourth conduit is an inert gas.

12. The device according to claim 1, wherein
a first feed line is associated with said first outlet port for feeding said first stream of mixed gas from said first mixing chamber to said first gas distribution system; and
a second feed line is associated with said second outlet port for feeding said second stream of mixed gas from said second mixing chamber to said second gas distribution system.

13. The device according to claim 12, further comprising:
means for measuring a volume of gas flow of said first stream of mixed gas; and
means for measuring a volume of gas flow of said second stream of mixed gas.

14. The device according to claim 12, further comprising:
a first regulator valve configured for regulating a volume of gas flow of said first stream of mixed gas; and a second regulator valve configured for regulating a volume of gas flow of said second stream of mixed gas.

* * * * *